United States Patent [19]
Yamaguchi

[11] Patent Number: 5,824,258
[45] Date of Patent: Oct. 20, 1998

[54] INJECTION MOLD FOR GOLF BALLS AND USE THEREOF

[75] Inventor: Takehiko Yamaguchi, Chichibu, Japan

[73] Assignee: Bridgestone Sports Co., Ltd., Tokyo, Japan

[21] Appl. No.: 862,243

[22] Filed: May 23, 1997

[30] Foreign Application Priority Data

May 28, 1996 [JP] Japan ................................. 8-156093

[51] Int. Cl.⁶ .................................................. B29C 45/00
[52] U.S. Cl. ........................ 264/328.1; 425/116; 425/542
[58] Field of Search .................................. 425/400, 573, 425/116, 542; 264/328.1

[56] References Cited

U.S. PATENT DOCUMENTS

| | | | |
|---|---|---|---|
| 4,128,385 | 12/1978 | Allen | 425/571 |
| 4,959,000 | 9/1990 | Giza | 425/116 |
| 5,122,046 | 6/1992 | Lavallee et al. | 425/116 |

Primary Examiner—Jay H. Woo
Assistant Examiner—Robert Hopkins
Attorney, Agent, or Firm—Sughrue, Mion, Zinn, Macpeak & Seas, PLLC

[57] ABSTRACT

In an injection mold for golf balls having a pair of separable mold segments (12, 12) defining a spherical cavity (22) when mated along a parting line (PL), at least ten hollow tubular gates (20) are disposed in the surfaces of the mold segments to be mated along the parting line and in fluid communication with the cavity. A stock material is injected into the cavity through the gates to mold a golf ball.

14 Claims, 5 Drawing Sheets

INJECTION MOLD FOR GOLF BALLS AND USE THEREOF

BACKGROUND OF THE INVENTION

1. Field of the Invention

This invention relates to an injection mold for the manufacture of golf balls, especially, golf balls having a thin cover of less than 3 mm around a core. It also relates to a method for preparing golf balls using the mold.

2. Prior Art

In general, golf balls are manufactured by injection molding a cover layer around a solid core or wound core. An injection mold comprising a pair of separable mold segments is often used. Referring to FIG. 4A, a typical injection mold 10 is illustrated as comprising a pair of separable upper and lower mold segments 12, 12. The mold segments 12, 12 define a spherical cavity 22 when mated along a parting line PL. The mold 10 as illustrated in FIG. 4B includes a main runner 14, an annular cold runner 16, a plurality of nozzles 18, and a corresponding plurality of gates 20. With this construction, a golf ball is manufactured by placing a core 30 at the center of the mold cavity 22, and supplying a cover stock based on a thermoplastic resin to the annular cold runner 16 through the main runner 14, thereby injecting the cover stock into the cavity 22 from the runner 16 through the nozzles 18 and gates 20.

At the end of molding cycle, the upper mold segment is opened and the molded part is taken out of the mold. The molding material left in the runner 16 and nozzles 18 is also solidified at the same time as the cover stock is solidified in the cavity 22. As a result, when removed from the mold cavity, the molded part is in a Saturn-like form, that is, in the form of a golf ball 32 having integrally joined thereto a ring 36 and ribs 38 of solidified cover stock corresponding to the annular runner 16 and nozzles 18, respectively, as shown in FIG. 5. Thereafter, the ribs 38 are cut off, which step is known as a gate cutting step, and burrs left at the gate positions are trimmed off.

In the above-mentioned injection mold, the gates 20 disposed between the runner 16 and the cavity 22 are hollow tubes of circular cross-sectional shape which are provided by mating grooves of semicircular cross-sectional shape in the mold segments 12, 12. Usually, one mold is provided with four to eight gates 20 (eight gates in the illustrated embodiment). The outlet of the gates 20 where the gate 20 opens to the cavity 22 is positioned in the land of the golf ball where no dimples are formed in the ball surface. This is because if the outlet of the gates 20 is positioned at the dimples, it is impossible to trim off gate burrs.

For current golf balls having diversified structures, the prior art mold mentioned above is not always satisfactory in molding capability. For example, where a relatively thin cover layer having a gage of up to 3 mm, especially up to 1.8 mm is to be molded around a core, the space defined between the core 30 and the cavity 22 surface of the mold is narrow enough to prevent the molding resin fed from the gates 20 from spreading throughout the space, often resulting in molding defects.

SUMMARY OF THE INVENTION

An object of the present invention is to provide an injection mold having gates in communication with the cavity which can effectively mold a golf ball.

Another object of the present invention is to provide an injection mold having gates in communication with the cavity which allows a molding material to be fed throughout the cavity even when a relatively thin cover layer having a gage of up to 3 mm is to be molded around a core.

A further object is provide a method for preparing a golf ball using the mold.

The present invention provides an injection mold for golf balls comprising a pair of separable mold segments defining a spherical cavity when mated along a parting line. A plurality of hollow tubular gates are disposed in the surfaces of the mold segments to be mated along the parting line and in fluid communication with the cavity. A stock material is injected into the cavity through the gates to mold a golf ball. According to the invention, ten or more gates are provided. The arrangement of ten or more gates allows the stock material to be fed throughout the cavity even when a relatively thin cover layer having a gage of up to 3 mm, especially up to 1.8 mm is to be molded around a core. Then a golf ball of quality is effectively molded.

By increasing the number of gates, the region of the cavity to be filled with the molding resin fed through each gate can be reduced. This ensures that the molding resin is effectively delivered throughout the space defined between the core 30 and the cavity 22 surface of the mold even when the space is made very narrow in order to mold a thin cover layer. A golf ball of quality is effectively molded while preventing the occurrence of molding defects such as sink marks, voids, weld marks, and flow marks. This benefit is accomplished only when the number of gates is increased to ten or more.

Accordingly, the present invention provides an injection mold for golf balls comprising a pair of separable mold segments defining a spherical cavity when mated along a parting line, and a plurality of hollow tubular gates disposed in the surfaces of the mold segments to be mated along the parting line and in fluid communication with the cavity, wherein a stock material is injected into the cavity through the gates to mold a golf ball, characterized in that at least ten gates are provided.

The present invention also provides a method for preparing a golf ball using the injection mold defined above, comprising the step of injecting a stock material into the cavity of the mold through at least ten gates to mold a golf ball.

The inventors also found that by tailoring the outlet cross section of gates to a suitable non-circular shape complying with the shape of a land of the golf ball, at least ten gates can be provided in good balance with respect to the cavity space. Additionally, opposed portions of the gate cross section separated by the parting line have an equal area. Then, even though the cross-sectional shape of the gate outlet is not circular, the molding material can be injected around the core in an evenly balanced manner without causing off-centering of the core. This ensures that golf balls of quality be effectively molded.

It was found by recent studies that the higher the percent area occupation by dimples on the golf ball surface, the longer becomes the flight distance. See JP-A 309282/1988, for example. The current approach is to distribute small dimples on the golf ball surface in a close arrangement to thereby increase the percent area occupation by dimples. This leads to the tendency that the current golf balls have a smaller land area. This, in turn, inevitably requires the prior art mold to restrict the position and size of gates. It is sometimes difficult to achieve a well balanced distribution of at least ten gates having a sufficient cross-sectional area.

If gates are positioned unequally along the circumference of a great circle corresponding to the parting line in order to distribute at least ten gates having a predetermined cross-sectional area, then the balance of resin injection is disordered to cause off-centering of the core, failing to produce a uniform molded part. Furthermore, if the gate 20 is positioned off the parting line PL toward a space available side so that the gate cross-sectional areas associated with the mold segments 12, 12 are different from each other as shown in FIG. 6, then he balance of resin injection is disordered to cause off-entering of the core, resulting in molding defects.

However, when the gates are tailored such that their cross-sectional shape is a suitable non-circular shape complying with the shape of a land of the golf ball and opposed portions of the gate cross section separated by the parting line have an equal area, ten or more gates having a sufficient cross-sectional area can be equidistantly distributed along the parting line (or circumference) even in an attempt to manufacture a golf ball having closely distributed small dimples. The objects of the invention are achieved in a more advantageous manner.

Accordingly, in the preferred embodiment of the present invention, the gate has a non-circular cross section at least where it opens to the cavity, and the gate cross section is separated by the parting line into opposed portions of an equal area.

BRIEF DESCRIPTION OF THE ACCOMPANYING DRAWINGS

The above and other objects, features and advantages of the invention will be more fully understood by reading the following description, taken in conjunction with the accompanying drawings.

DETAILED DESCRIPTION OF THE INVENTION

Figure 1A:
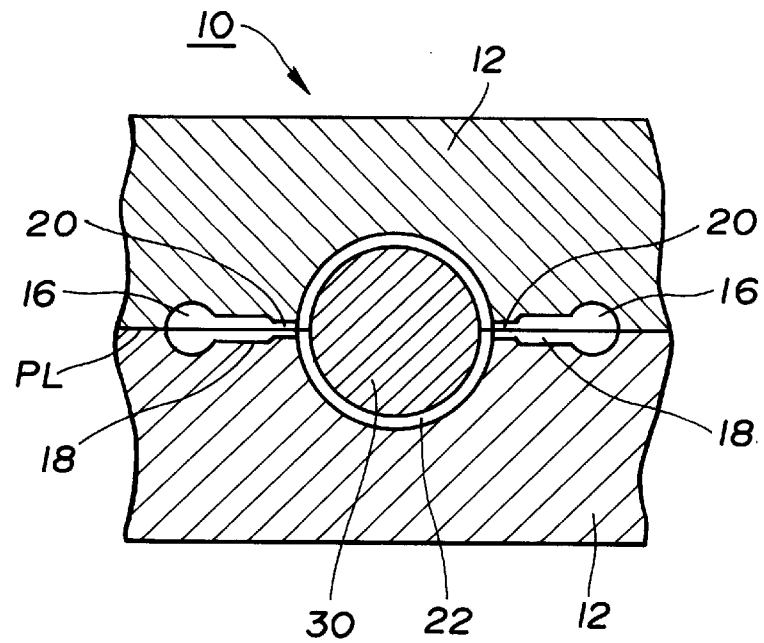
FIG. 1 illustrates an injection mold for golf balls comprising a pair of mold segments according to one embodiment of the invention, FIG. 1A being an elevational cross-sectional view and FIG. 1B being a plan view of the lower mold segment.
Figure 1B:
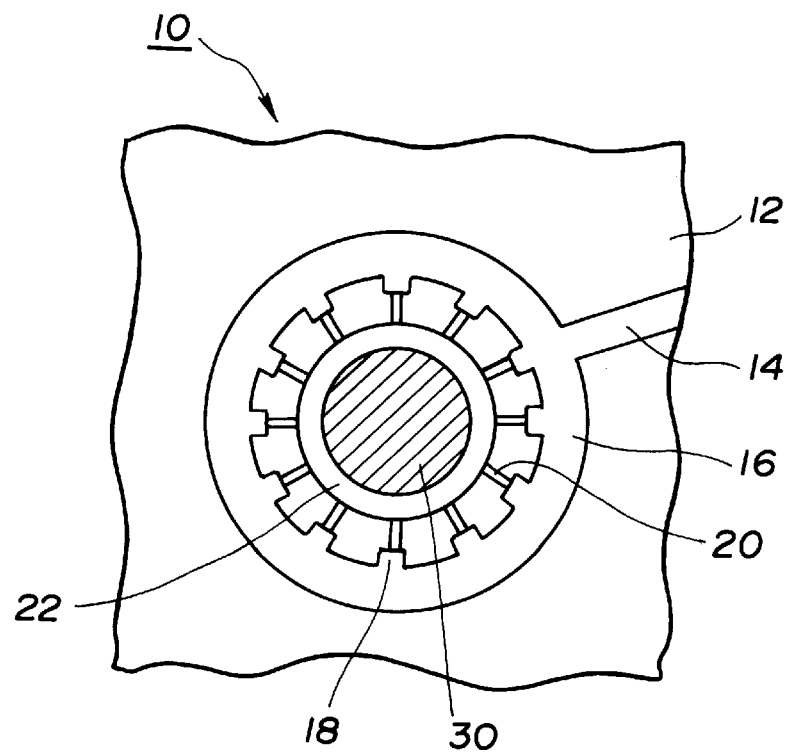

Referring to FIG. 1, an injection mold 10 according to the invention is illustrated as comprising a pair of separable upper and lower mold segments 12, 12. The mold segments 12, 12 define a spherical cavity 22 when mated along a parting line PL. The mold 10 includes a main runner 14, an annular cold runner 16 connected to the main runner 14, extending along the parting line PL and circumscribing the cavity 22, a plurality of circumferentially equally spaced nozzles 18 extending radially inwardly from the annular cold runner 16, and a corresponding plurality of circumferentially equally spaced gates 20 radially extending from the nozzles 18 and opening to the cavity 22. With this construction, a golf ball is manufactured by placing a core 30 at the center of the mold cavity 22, and supplying a cover stock based on a thermoplastic resin to the annular cold runner 16 through the main runner 14, thereby injecting the cover stock into the cavity 22 from the runner 16 through the nozzles 18 and gates 20 to form a cover layer around the core 30.

According to the invention, the mold includes ten or more gates 20 (twelve gates in the illustrated embodiment). The number of gates 20 can be properly determined in accordance with the gage of a cover layer, the arrangement of dimples, and the type of molding resin as long as the number is ten or more. Usually ten to twelve gates are provided. Ten to sixteen gates are preferred particularly when a thin cover layer having a gage of up to 3 mm, especially up to 1.8 mm is molded. The gates 20 are arranged along the parting line PL between the mold segments 12, 12 and should preferably be equidistantly spaced in a circumferential direction.

Figure 2A:
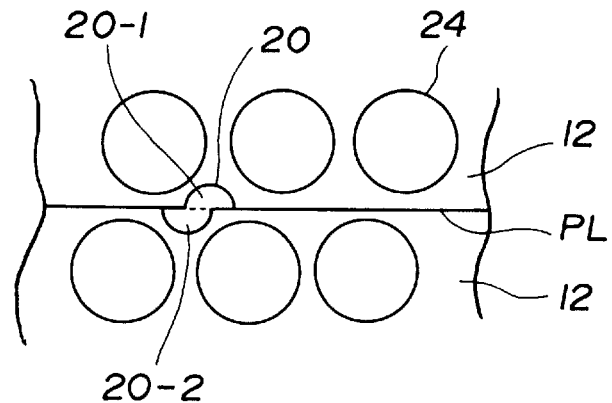
FIG. 2 is a fragmentary enlarged side view showing a gate outlet disposed in mold segments of an injection mold according to the invention, FIGS. 2A, 2B and 2C showing different cross-sectional shapes of the gate outlet.
Figure 2B:
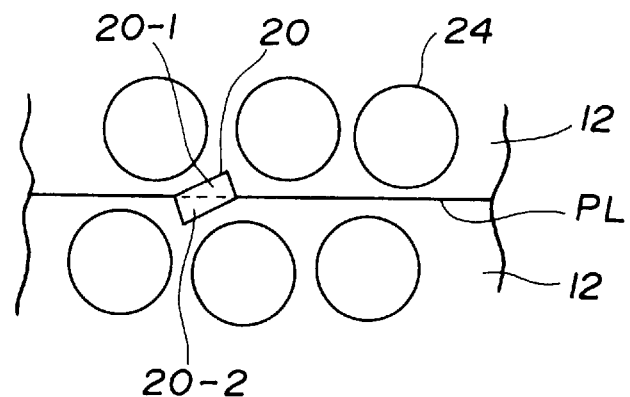
Figure 2C:
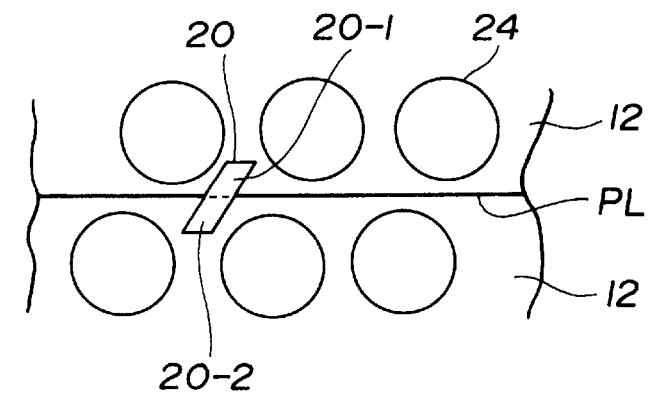
Figure 3A:
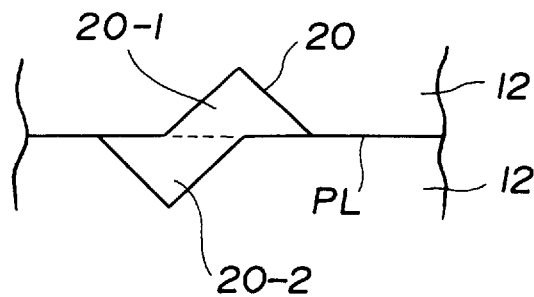
FIGS. 3A, 3B and 3C show different cross-sectional shapes of the gate outlet according to the invention.
Figure 3B:
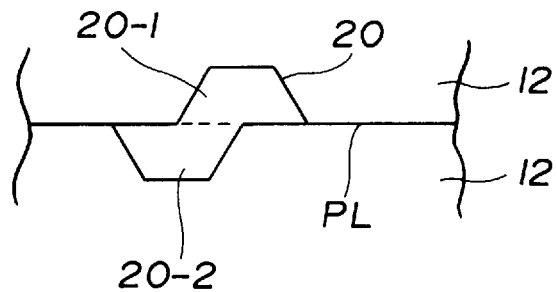
Figure 3C:
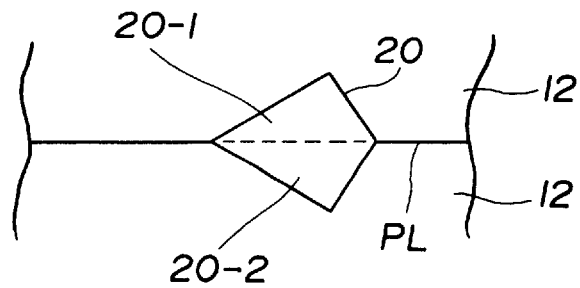
Figure 4:
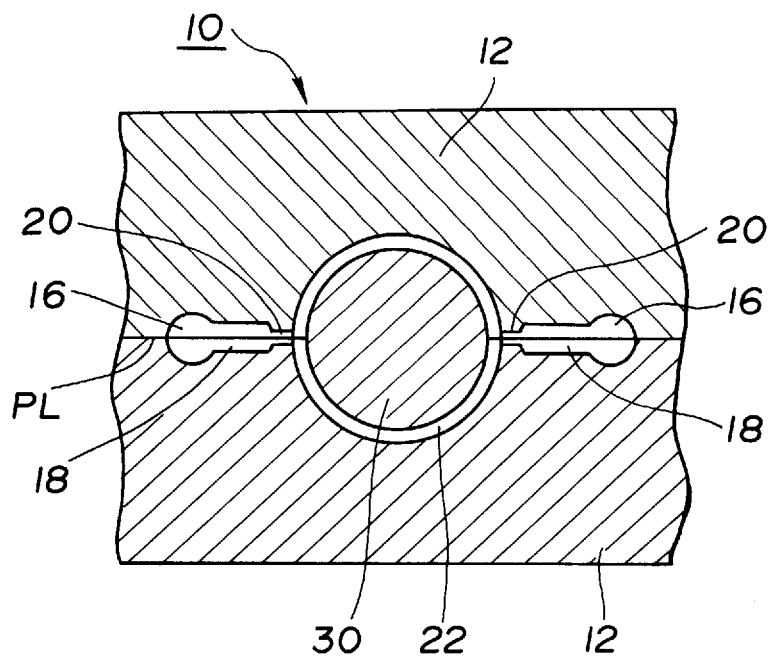
FIG. 4 illustrates a prior art injection mold for golf balls comprising a pair of mold segments, FIG. 4A being an elevational cross-sectional view and FIG. 4B being a plan view of the lower mold segment.
Figure 4:
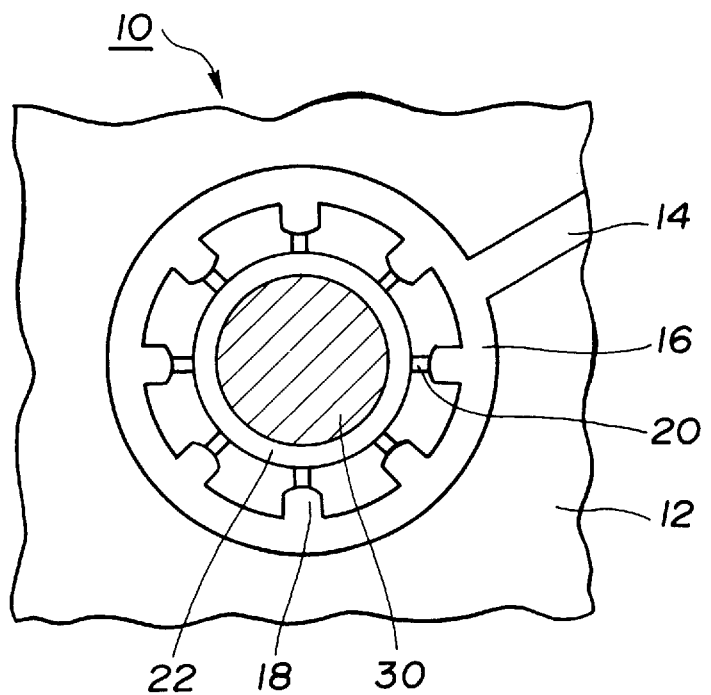

The cross-sectional shape of gates 20 may be circular as in prior art gates. In the preferred embodiment of the invention, the outlet of the gate 20 where it opens to the mold cavity has a non-circular cross-sectional shape. In FIG. 2, the outlet of the gate 20 is shown in the cavity-defining surfaces of the mold segments 12, 12. The gate outlet has a non-circular shape. Different cross-sectional shapes of the gate outlet are shown in FIGS. 2A, 2B and 2C. FIG. 2A shows two semi-circular shapes joined with their centers offset along the parting line PL. FIGS. 2B and 2C show a parallelogramic gate outlet. The parallelogram shown in FIG. 2B is diagrammatically divided into two portions by the parting line PL. The parallelogram shown in FIG. 2C is divided into two portions by the parting line PL passing the intermediate points on a set of parallel sides. FIG. 3A shows two triangular shapes joined at the bottom in a staggered manner along the parting line PL. FIG. 3B shows two mesa shapes joined at the bottom in a staggered manner along the parting line PL. FIG. 3C shows two triangular shapes joined along the parting line PL with their bottom sides coincident. The gate outlet may take any desired shape other than circle in accordance with the shape of the land of the golf ball. Then even when a golf ball having small dimples closely distributed thereon for an increased percent dimple area occupation is to be manufactured, the gates 20 having a desired cross-sectional area can be uniformly distributed in accordance with the dimple arrangement and positioned at an area corresponding to the land of the golf ball.

It is noted that the cavity-defining surface of each mold segment 12 has a negative dimple pattern, that is, dimple-forming protrusions 24 are arranged on the cavity-defining surface of the mold segment 12 in FIG. 2.

As shown in FIGS. 2 and 3, the gate 20 is formed across the parting line PL between the upper and lower mold segments 12, 12. The parting line PL divides the gate 20 into two opposed portions 20-1 and 20-2 which should preferably have an equal cross-sectional area. If the opposed portions 20-1 and 20-2 have different cross-sectional areas, then the resin injection balance between the upper and lower mold segments is disrupted, inviting inconvenience such as deviation of the core from the cavity center to inhibit accurate molding. As long as the opposed portions 20-1 and 20-2 have an equal cross-sectional area, their shapes may be either identical or different from each other. It is preferred for resin injection balance that the opposed portions 20-1 and 20-2 be congruent with each other as shown in FIGS. 2 and 3. The respective gates may have different shapes although it is preferred for resin injection balance that all the gates have the same cross-sectional area.

If the gate 20 is located in close proximity to the dimple edge, fragments of trimmed burrs can fuse to the dimple edge, becoming defects. Therefore, the outlet of the gate 20 should preferably be positioned in the land area of the golf ball at a certain spacing from the dimple-forming protrusion 24. More particularly, the gate 20 is spaced a distance of about 0.05 to 3.0 mm, especially about 0.1 to 1.0 mm from the dimple-forming protrusion 24.

An appropriate cross-sectional area of the gate 20 to allow the molding resin to be injected therethrough is about 0.20 to 3.14 mm$^2$, especially about 0.35 to 1.50 mm$^2$ although the cross-sectional area of the gate 20 is properly determined in accordance with the dimple arrangement and the number of gates and not particularly limited. A cross-sectional area of about 0.20 to 1.80 mm$^2$, especially about 0.50 to 0.80 mm$^2$ are preferred particularly when a thin cover layer having a gage of up to 3 mm, especially up to 1.8 mm is molded.

No particular limit is imposed on the construction of the mold other than the gates and the mold may have the same construction as prior art molds.

By increasing the number of gates to ten or more, the region of the cavity to be filled with the molding resin fed through one gate can be reduced. This ensures that the molding resin is effectively fed to spread throughout the space defined between the core 30 and the cavity 22 surface of the mold even when the space is made very narrow in order to mold a thin cover layer. A golf ball of quality is effectively molded while preventing the occurrence of molding defects such as sink marks, voids, weld marks, and flow marks.

The mold of the preferred embodiment of the invention wherein the gates 20 have a non-circular cross-sectional shape has the advantage that gates having a relatively large cross-sectional area can be provided outside the dimple areas even when it is desired to manufacture a golf ball having small dimples closely distributed thereon and hence, an increased percent dimple area occupation. Relatively less restriction is imposed on the position where the gates are provided. Ten or more gates 20 can be uniformly arranged in a circumferential direction. Since the opposed portions 20-1 and 20-2 of the gate 20 separated by the parting line PL have the same cross-sectional area despite the non-circular shape, the molding material can be injected into the cavity in good balance.

Therefore, using the mold of the invention, even a golf ball having a thin cover layer of up to 3 mm thick, especially up to 1.8 mm thick and small dimples closely distributed thereon for an increased percent dimple area occupation can be effectively injection molded without leaving molding defects.

Figure 5:
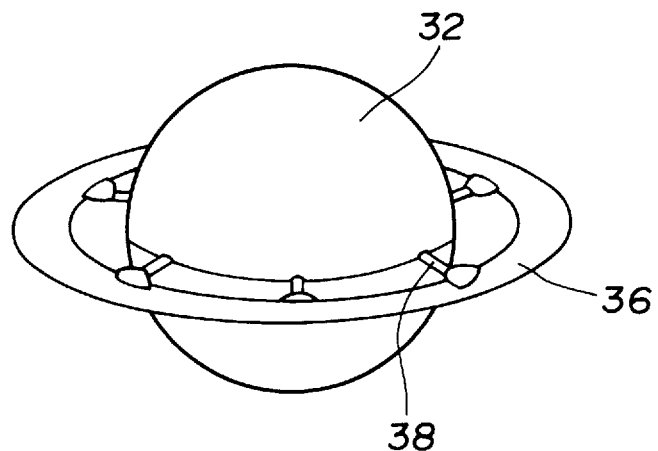
FIG. 5 is a perspective view of a golf ball as molded and removed from the mold of FIG. 4.
Figure 6:
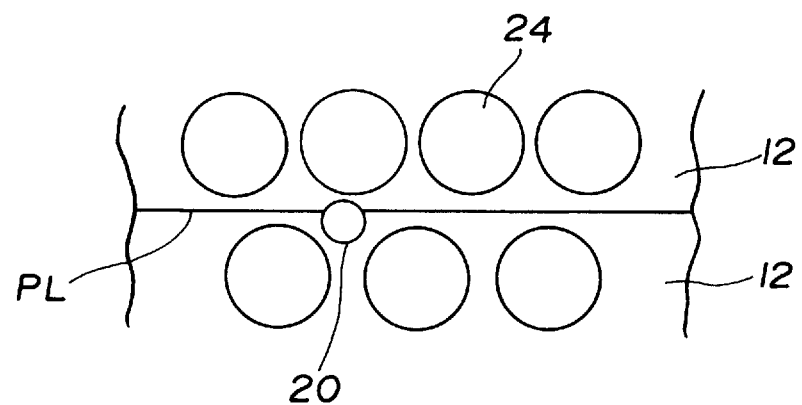
FIG. 6 illustrates one exemplary gate in a prior art injection mold.

In injection molding golf balls in the mold of the invention, the procedure and conditions may be the same as in prior art molds. For example, a two-piece solid golf ball having a cover injection molded over a solid core can be manufactured, for example, by placing the solid core 30 at the center of the cavity 22 as shown in FIG. 1, mating the upper and lower mold segments 12, 12 together to close the cavity 22, injection feeding a cover stock, typically ionomer resin compound in a molten state into the cavity 22 through the gates 20, cooling the cover stock for solidification, opening the upper mold segment 12, removing the molded part in the form shown in FIG. 5, cutting the gate ribs, and trimming off burrs. The mold of the invention is suited for molding such a cover layer of two-piece golf balls, especially a thin cover layer of up to 3 mm thick, especially up to 1.8 mm thick as well as multi-piece solid golf balls having a three or more layer structure. In addition, the mold of the invention is equally applicable to the manufacture of wound golf balls by injection molding a cover layer around a wound core and the manufacture of one-piece golf balls by injection molding.

The mold of the invention is not limited to the illustrated one of FIGS. 1 to 3. Proper modifications may be made on the shape of the gate 20 as well as the arrangement of the main runner 14, cold runner 16, and nozzle 18 without departing from the scope of the invention. It is also acceptable that the mold be provided with other well-known means such as a coolant channel for circulating coolant water.

There has been described an injection mold having ten or more gates by means of which golf balls of quality can be molded in an efficient manner. Even when a relatively thin cover layer having a gage of up to 3 mm is molded around a core, the stock material can be effectively supplied throughout the narrow cavity space, ensuring effective molding of golf balls.

Although some preferred embodiments have been described, many modifications and variations may be made thereto in the light of the above teachings. It is therefore to be understood that within the scope of the appended claims, the invention may be practiced otherwise than as specifically described.

I claim:

1. An injection mold for a golf ball having dimples comprising; a pair of separable mold segments defining a spherical cavity when mated along a parting line, a plurality of hollow tubular gates disposed in the surfaces of the mold segments to be mated along the parting line and in fluid communication with the cavity, wherein a stock material is injected into the cavity through the gates to mold a golf ball, at least ten gates provided substantially equidistantly spaced in a circumferential direction such that each of said gates is positioned at an area corresponding to a land of the golf ball and has a non-circular cross-sectional shape, which is divided into two opposed portions by said parting line of the mold segments so that said two opposed portions of each of said gates has substantially an equal cross-sectional area.

2. The injection mold of claim 1 wherein ten to sixteen gates are provided.

3. The injection mold of claim 1 wherein said gates are spaced to a distance of 0.05 to 3.0 mm from a dimple-forming protrusion.

4. The injection mold of claim 1 wherein said gates have a cross-sectional area of 0.2 to 1.8 mm$^2$.

5. The injection mold of claim 1 wherein said gates have a cross-sectional shape comprising two semi-circular shapes joined with their centers offset along the parting line.

6. The injection mold of claim 1 wherein said gates have a cross-sectional shape comprising a parallelogram diagrammatically divided into two portions by the parting line.

7. The injection mold of claim 1 wherein said gates have a cross-sectional shape comprising a parallelogram divided into two portions by the parting line passing the intermediate points on a set of parallel sides.

8. The injection mold of claim 1 wherein said gates have a cross-sectional shape comprising two triangular shapes joined at the bottom in a staggered manner along the parting line.

9. The injection mold of claim 1 wherein said gates have a cross-sectional shape comprising two mesa shapes joined at the bottom in a staggered manner along the parting line.

10. The injection mold of claim 1 wherein said gates have a cross-sectional shape comprising two triangular shapes joined along the parting line with their bottom sides coincident.

11. A method of injection molding a golf ball comprising; utilizing a pair of separable mold segments defining a spherical cavity when mated along a parting line, and a plurality of hollow tubular gates disposed in the surfaces of the mold segments to be mated along the parting line and in fluid communication with the cavity, providing at least ten gates which are non-circular in cross-sectional shape, substantially equidistantly spaced in a circumferential direction about said spherical cavity, and positioned at an area corresponding to a land of the golf ball, and wherein said gates are divided into two opposed portions by said parting line of the mold segments so that said two opposed portions of said gate have substantially an equal cross-sectional area, injecting a stock material through said at least ten gates into said cavity to mold a golf ball, and removing the thus molded ball from said mold.

12. The method of claim 11 wherein said stock material comprises a cover layer and said molding is of a cover layer up to 3 mm in thickness.

13. The method of claim 11 further comprising the step of placing a solid core at the center of said spherical cavity prior to the step of injecting a stock material, whereby a two-piece golf ball is produced.

14. The method of claim 11 further comprising the step of placing a wound core at the center of said spherical cavity prior to the step of injecting a stock material.

* * * * *